(12) United States Patent  (10) Patent No.: US 8,446,034 B1
Stevens  (45) Date of Patent: May 21, 2013

(54) ELECTRIC POWER GENERATION USING A WIND CHUTE

(76) Inventor: Geoffrey Stevens, Tacoma, WA (US)

( * ) Notice: Subject to any disclaimer, the term of this patent is extended or adjusted under 35 U.S.C. 154(b) by 48 days.

(21) Appl. No.: 13/272,900

(22) Filed: Oct. 13, 2011

(51) Int. Cl.
*F03D 9/00* (2006.01)

(52) U.S. Cl.
USPC ............................................. 290/55; 290/44

(58) Field of Classification Search
None
See application file for complete search history.

(56) References Cited

U.S. PATENT DOCUMENTS

| | | | | |
|---|---|---|---|---|
| 3,924,827 A | * | 12/1975 | Lois | 244/153 R |
| 4,076,190 A | * | 2/1978 | Lois | 244/153 R |
| 4,087,990 A | * | 5/1978 | Gillette | 464/148 |
| 4,124,182 A | * | 11/1978 | Loeb | 244/153 R |
| 4,481,900 A | * | 11/1984 | Rutten et al. | 114/311 |
| 6,072,245 A | * | 6/2000 | Ockels | 290/55 |
| 6,498,402 B2 | * | 12/2002 | Saiz | 290/55 |
| 7,188,808 B1 | * | 3/2007 | Olson | 244/153 R |
| 7,656,053 B2 | * | 2/2010 | Griffith et al. | 290/44 |
| 8,247,912 B2 | * | 8/2012 | Da Costa Duarte Pardal et al. | 290/44 |
| 2007/0120005 A1 | * | 5/2007 | Olson | 244/33 |
| 2007/0126241 A1 | * | 6/2007 | Olson | 290/55 |
| 2008/0231058 A1 | * | 9/2008 | Nicholson et al. | 290/55 |
| 2010/0032949 A1 | * | 2/2010 | Varrichio et al. | 290/44 |
| 2010/0032956 A1 | * | 2/2010 | Varrichio et al. | 290/55 |
| 2011/0210559 A1 | * | 9/2011 | Zanetti et al. | 290/55 |

* cited by examiner

*Primary Examiner* — Vanessa Girardi
(74) *Attorney, Agent, or Firm* — Lawrence J. Gibney, Jr.

(57) ABSTRACT

This device will generate electric power using wind current as long as the wind is sufficient to inflate and move a chute to a predetermined point. The chute is then inverted and retrieved by the device to start the cycle of inflation over again. The device will enable the generation of power that is reusable and clean and environmentally friendly.

4 Claims, 3 Drawing Sheets

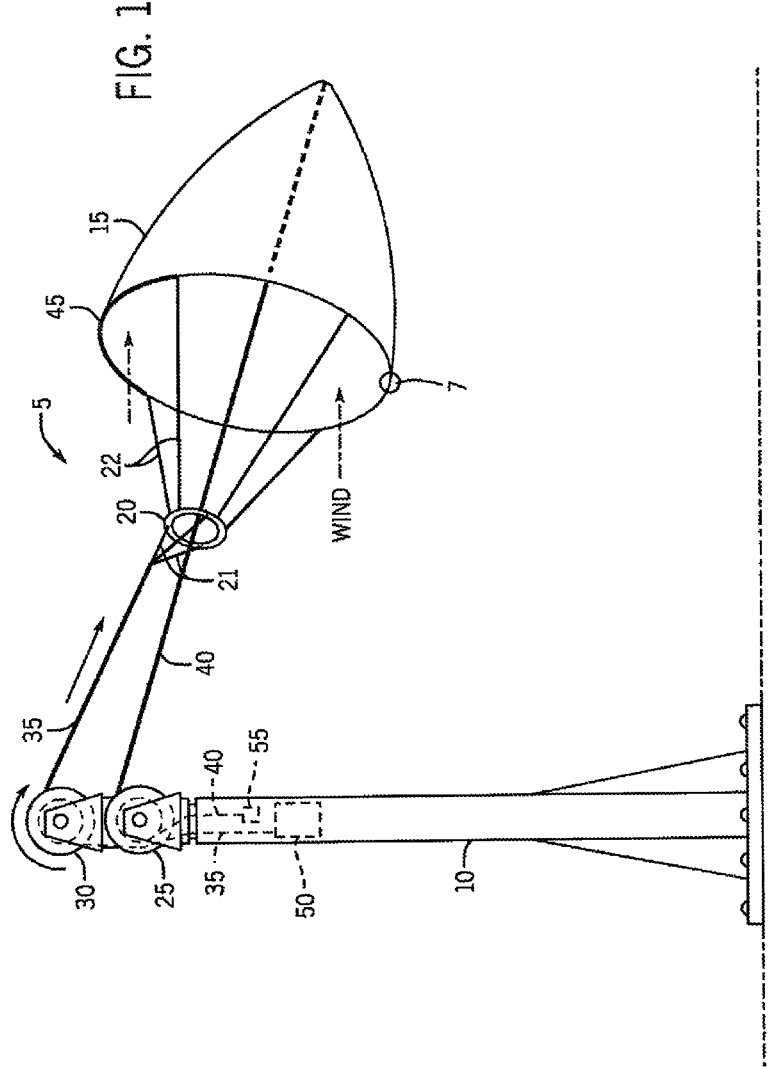

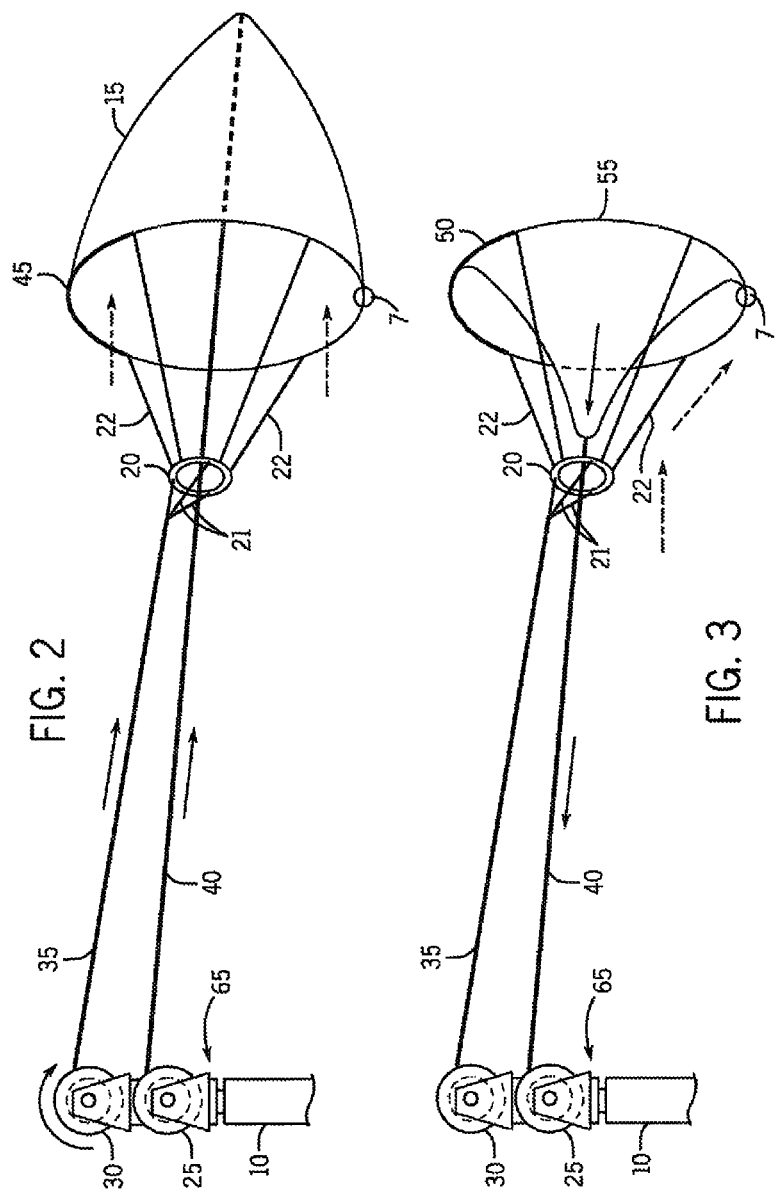

ELECTRIC POWER GENERATION USING A WIND CHUTE

BACKGROUND OF THE INVENTION

A. Field of the Invention

This is a method to generate electric power using the power of wind. This will enable utilities and municipalities to produce renewable, clean energy with very little human involvement and very little investment in terms of capital expenditure. The device will produce renewable, clean energy that will also be environmentally friendly.

B. Prior Art

There are many other types of devices that serve to catch the wind to generate power. Many of these references are wind turbine devices such as Grabau, U.S. Pat. No. 7,994,652 that generate power as the wind moves a blade or series of blades. In this application the wind is captured by a chute system and power generated as the chute moves away from the tower by catching the wind in the chute.

An example in the prior art of a wind catchment device can be found at Saiz, U.S. Pat. No. 6,498,402, which is a series of chutes plates between two masts that catch the wind and move a generator as the chutes move along a track between the masts. One of the principal disadvantages of this type of system is the cost involved and there is no method to capture the wind if the direction of the wind changes.

With this application the wind can be captured because the top portion or platform will be allowed to rotate in order to increase efficiency and maximize the generation of electricity.

BRIEF SUMMARY OF THE INVENTION

One of the challenges of producing power from wind is that the wind is not always constant. In fact there are times when there is no wind and times when there are extremes in wind. In order to address this issue this device is designed permit the maximum generation of power from wind while at the same time being extremely hands free in terms of human involvement.

A tower that houses the electrical generating means is installed in the ground. With this application more than one tower may be contemplated. The tower will extend a predetermined height above the ground and will be used to support a wind sock or wind chute that will float away from the tower when the wind fills the interior of the chute.

On the top of the tower will be a series of pulleys or winches.

A first pulley will support a cable that will be attached to the interior of the wind chute. This first pulley will allow the cable to extend a predetermined distance from the tower and then a stop will be employed to prevent the cable from extending any further from the tower.

A second pulley will support a second cable that will be attached at one end to a means to generate electricity and at the other end to a ring that is connected to the wind chute. The end of the cable that is attached to the means to generate electricity will be allowed to extend a greater distance than the cable for the first pulley.

The cable that rides over the first pulley will allow the wind chute to travel away from the tower to a predetermined point. Once at that predetermined point the cable that is associated with the first pulley will prevent the chute from moving further away from the tower.

The cable that uses the second pulley is attached to the electrical generating means at one end and to a ring on the chute at the other. A plurality of cables from the ring to the chute will be provided in order to provide support for the ring and chute and to address the relatively strong forces that may be encountered by the chute.

As the wind forces the chute away from the tower, it will come to a point that will stop the movement of the chute away from the tower. The second cable will continue to move away from the tower and will eventually invert the position of the wind chute. At this point in time computer software will retrieve the chute or bring it back to the tower after the chute has been inverted.

Additionally the top of the platform will rotate so that the chute is positioned such that the chute maintains the best position to capture the greatest wind.

Once the chute is back at the tower, the two cables will force the chute to open in its normal configuration as it fills up with wind. Once again the movement backward or away from the tower will rotate the electrical generating means that is contained within the tower. Because the power that is required to reposition the chute in the inverted position is less than the power that is generated when the chute is moving away from the tower, there will be a net energy gain.

Depending on the amount of power that is required will dictate the size of chute. Additionally, because of varying wind conditions, the chute must be made from material and sized to prevent damage to the chute and any other pieces of equipment that are associated with this device.

BRIEF DESCRIPTION OF THE DRAWINGS

FIG. 1 is a side view of the device.

FIG. 2 is a depiction of the chute as it is being deployed and moving away from the tower.

FIG. 3 is a depiction of the chute as it becomes inverted.

NUMBERING REFERENCES

Figure 4:
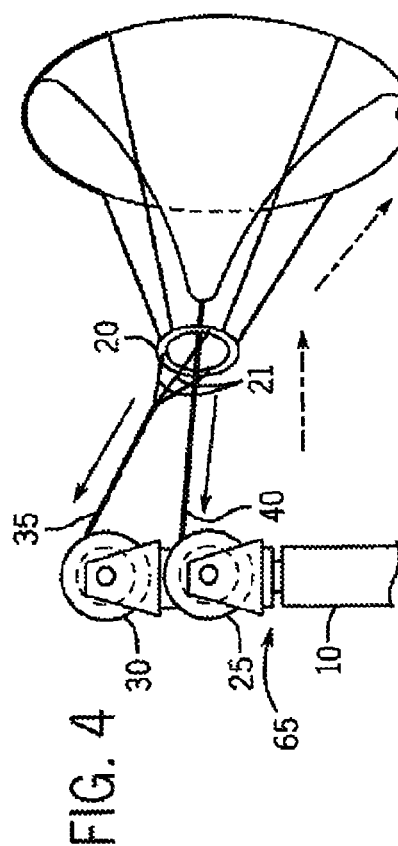
FIG. 4 is a depiction of the chute being retrieved with the chute in the inverted position.
Figure 5:
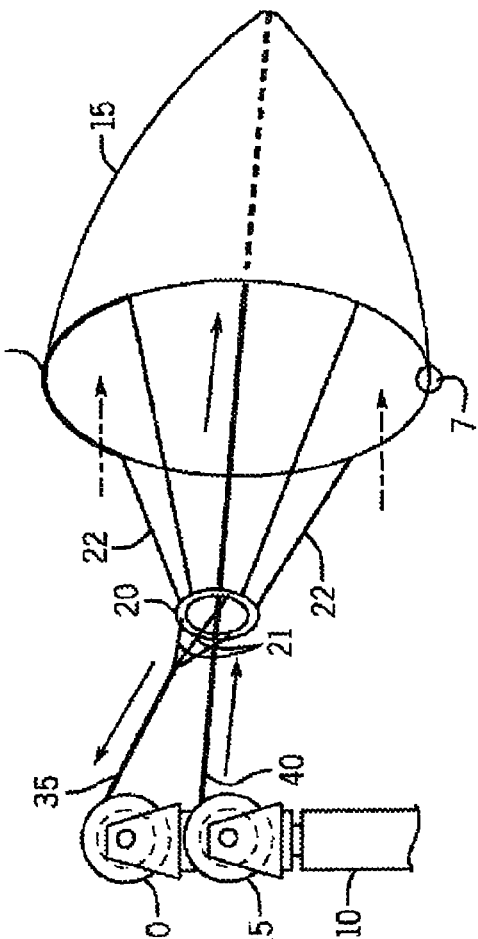
FIG. 5 is a depiction of the chute as it being opened by the wind and moving away from the tower.

| | |
|---|---|
| 5 | Device |
| 7 | Weight |
| 10 | Tower |
| 15 | Wind chute |
| 20 | Cable Ring |
| 21 | Support Cables for the Ring |
| 22 | Ring to Chute Cables |
| 25 | First Pulley |
| 30 | Second pulley |
| 35 | Second Cable |
| 40 | First Cable |
| 45 | Rigid reinforcing surface |
| 50 | Means to generate electricity |
| 55 | Winch |
| 60 | Software |

DETAILED DESCRIPTION OF THE EMBODIMENTS

The wind chute 15 is mounted on a tall tower or mast 10. Within the tower will be a means to generate electricity 50.

As the wind travels past the tower, it will inflate the chute 15 and force the chute to move away form the tower 10. The chute 5 is drawn out by wind power, and with sufficient wind, can become essentially perpendicular to the mast 10 such as depicted in FIG. 1.

On the top of the tower 10 are two pulleys—a first pulley 25 and a second pulley 30 with associated cables, a first cable 40 and second cable 35. Both pulleys are allowed to freely rotate.

The second pulley 30 supports the second cable 35, which is connected to the means to generate electricity 50 that is located in the tower 10 at the first end and to the cable ring 20 at the second end. As the chute 15 fills with air the chute will move away from the tower 10 and the cable will deploy the electrical generating means 50 that is contained within the tower 10.

At the same time as the chute is moving away from the tower, the first cable 40 is also moving over the first pulley 25. The first cable 40 is attached at the first end to the interior of the chute and at the second end to a winch 55 in the tower 10. At a predetermined position the first cable 40 will stop its movement away from the tower 10. The second cable 35 will continue to move away from the tower 10.

The exact point at which the first cable 40 will stop its movement will be determined by the forces of the tower that are created by the chute as it moves away from the tower 10. Because the force of the wind will vary, software that will detect the force of the wind and will control the winch 55 to determine the stopping point for the first cable.

As a means to reinforce the chute and to insure that the chute will maintain its shape a rigid member 45 on a section of the top of the chute 15 will be provided. Additionally, ring to chute cables 22 and support cables for the ring 21 will also be provided. The first cable 40 passes through the center of the cable ring 20 and this will insure that the cables do not get tangled and the cables maintain the appropriate alignment relative to each other.

Once the first cable 40 stops moving, the second cable 35 will continue to move away from the tower 10 and this will force the chute to invert such as depicted in FIG. 3. Once the chute is inverted the chute is retracted so that it is again in close proximity to the tower 10.

Software 60 will be used to control when the first cable 40 stops and also when the chute 15 is retracted. The software 60 is designed so that the operation of this device both in terms of the position of the chute and the point at which the chute is retracted is hands free and can be operated remotely.

The power that is required to pull the chute when inverted is less that trying to retrieve the chute when it is filled with air and subjected to the forces of the wind, thus creating a net gain of electrical power generation.

Once the inverted chute is positioned in close proximity to the tower 10 the chute 15 is again allowed to fill with air and move away from the tower 10.

Because the wind speed will vary from day to day or even hour to hour software 60 will be used to determine the ideal stopping point for the first cable 40. The other challenge with wind is the wind may change direction and it is important to align the chute downwind of any wind. The top section 65 of this device will be allowed to rotate so that it may capture the maximum amount of wind. The direction of the wind will not determine the stopping point of the first cable as the stopping point is largely a function of the speed of the wind and the resultant force on the chute 15.

More that one chute and set of pulleys and winches may be attached to the mast so that there may be two chutes operational from one mast. Appropriate design considerations must be considered in order to prevent damage to the tower and the chute.

The process of generating electricity will also include battery storage for power or it may provide for direction connection to the grid.

In the event of no wind, the chute 15 will drape down and approximately twenty-five percent (25%) of the top surface of the chute 15 will be reinforced with the rigid reinforcing member 45. A weight 7 at the bottom across from the rigid member 45 will also help hold it open so that it will always be ready to inflate under the appropriate wind conditions.

While the embodiments of the invention have been disclosed, certain modifications may be made by those skilled in the art to modify the invention without departing from the spirit of the invention.

The inventor claims:

1. A device to create electrical power using a wind chute that is comprised of:
   a. a tower,
   wherein the tower is of a predetermined size;
   said tower has a top section;
   b. electrical generating means,
   wherein the means to generate electricity is housed in the tower;
   c. chute,
   wherein a chute of a predetermined shape is provided;
   d. a first pulley,
   wherein the first pulley is allowed to freely rotate;
   said first pulley supports the first cable;
   e. a first cable,
   wherein the first cable is secured to the interior of the chute at the first end;
   wherein the first cable is secured to a winch at the second end;
   wherein the first cable passes through a cable ring;
   wherein the first cable passes over the first pulley;
   f. a second pulley,
   wherein the second pulley is allowed to freely rotate;
   wherein the second pulley supports the second cable;
   g. a second cable,
   wherein the second cable is connected to the means to generate electricity at the first end;
   wherein the second cable is connected to a cable ring at the second end;
   h. a cable ring,
   i. support cables for the cable ring,
   j. ring to chute cables,
   k. rigid reinforcing member,
   wherein the rigid reinforcing member is secured to a portion of the chute;
   l. weight,
   wherein a weight is placed opposite from the rigid reinforcing member,
   m. software,
   wherein software is provided,
   said software determines the stopping point of the first cable,
   said software determines when the chute is retrieved after being inverted;
   said software determines the ideal positioning of the chute depending on the direction of the wind;
   n. means to rotate the top section;
   wherein a means to rotate the top section is provided.

2. The device as described in claim 1 wherein the means to rotate the top section is a platform.

3. The device as described in claim 1 wherein the software operates the position of the chute remotely.

4. The device as described in claim 1 wherein the software operates the stop point of the chute remotely.

* * * * *